Patented May 9, 1950

2,506,676

UNITED STATES PATENT OFFICE 2,506,676

ALPHA, OMEGA-BIS (2-CHLOROETHOXY) POLYMETHYLPOLYSILOXANE

Emanuel R. Lieberman, Jackson Heights, N. Y., assignor to Interchemical Corporation, New York, N. Y., a corporation of Ohio No Drawing. Application April 7, 1949, Serial No. 86,117

3 Claims. (Cl. 260—448.8)

This invention relates to 2-halogenoethoxy polysiloxane compounds. It is particularly concerned with novel alpha, omega-bis(2-chloroethoxy) polymethylpolysiloxanes of the general formula $ClCH_2CH_2$—O—[Si$(CH_3)_2$O]$_n$CH$_2$CH$_2$Cl, where $n$ is greater than 1.

It has been discovered that polysiloxanes having the above general formula can be prepared by reacting dichloropolymethylpolysiloxanes with ethylene oxide. In general the reaction is carried out by passing ethylene oxide gas into a dichloropolymethylpolysiloxane under a pressure of about 50 mm. of mercury while maintaining the temperature at 50° to 60° C. The following example will illustrate more specifically the manner in which the novel polysiloxane compounds can be prepared.

*Example 1.—1,3-bis(2-chloroethoxy) tetramethyldisiloxane*

Into a glass reaction vessel equipped with a reflux condenser and a gas inlet tube were placed 500 parts of 1,3-dichlorotetramethyldisiloxane (prepared according to Patnode and Wilcock, Journal American Chemical Society, vol. 68, page 358, 1946). Ethylene oxide gas, under a pressure of 50 mm. of mercury, was then passed into the vessel and bubbled through the liquid at 50° to 60° C. for about 12 hours. The reaction becomes exothermic and it is necessary to cool the reaction vessel, as by use of an ice-bath, in order to maintain the temperature within the optimum range of 50° to 60° C. To isolate the principal reaction product the reaction mixture was fractionally distilled at a pressure of 11 mm. of mercury. The yield of bis(2-chloroethoxy) tetramethyldisiloxane, i. e.

$ClCH_2CH_2OSi(CH_3)_2$—OSi$(CH_3)_2$—OCH$_2$CH$_2$—Cl boiling at 90°–93° C. at 11 mm., was 82%.

In a manner similar to that of Example 1, 1,5-bis(2-chloroethoxy) hexamethyltrisiloxane has been prepared from 1,5-dichlorohexamethyltrisiloxane and ethylene oxide. The yield of the polysiloxane having a boiling point of 143°–145° C. at 11 mm. was 84%.

The novel compounds of the present invention, in addition to being useful as solvents, high boiling liquids, lubricants, etc., also are possible intermediates for the preparation of other important and useful materials. Due to the fact that they contain the —Si—O—Si— groups similar to the silicone resins, they furnish a means of preparing modified silicone polymers by interacting them with polyfunctional modifying reactants which will react with the chlorine atoms.

I claim:

1. Alpha, omega-bis(2-chloroethoxy) polymethylpolysiloxanes having the general formula $ClCH_2CH_2O[Si(CH_3)_2$—O]$_n$CH$_2$CH$_2$Cl wherein $n$ is greater than 1.

2. 1,3 bis(2-chloroethoxy) tetramethyldisiloxane.

3. 1,5 bis(2-chloroethoxy) hexamethyltrisiloxane.

EMANUEL R. LIEBERMAN.

REFERENCES CITED

The following references are of record in the file of this patent:

UNITED STATES PATENTS

| Number | Name | Date |
|---|---|---|
| 2,381,138 | Patnode | Aug. 7, 1945 |
| 2,381,366 | Patnode | Aug. 7, 1945 |